United States Patent Office 3,207,751
Patented Sept. 21, 1965

---

3,207,751
6-FLUORO-16β-METHYL CORTICOSTEROIDS
Ellis Rex Pinson, Jr., Jackson Heights, N.Y., assignor to Chas. Pfizer & Co., Inc., New York, N.Y., a corporation of Delaware
No Drawing. Filed Aug. 26, 1959, Ser. No. 836,075
7 Claims. (Cl. 260—239.55)

The present invention is concerned with new and useful steroid compounds and to a procedure for producing them. More particularly, it is concerned with certain 16β-methyl pregnane derivatives and 21-esters thereof, to novel intermediates in the production thereof, and a process for the production of the novel compounds and the novel intermediates.

Although 16β-methyl pregnane derivatives are known, the 6α-fluoro and 6β-fluoro-16β-methyl derivatives have not yet been reported. This application is a continuation-in-part of the earlier filed U.S. patent application Serial Number 778,330, filed December 5, 1958, now abandoned.

Compounds of the character described in the present application possess valuable anti-inflammatory, anti-rheumatoid arthritic and glucocorticoid activity to a remarkable degree. The 6-fluoro-16β-methylated corticosteroids of the invention have been found to possess these valuable therapeutic activities to a much higher degree than the heretofore available 16-methylated corticosteroids.

These compounds are also useful in the treatment of inflammatory conditions of the skin, ears and eyes of humans and of valuable domestic animals as well as contact dermatitis and other allergic reactions. Compositions containing the valuable compounds of the present invention can be prepared for administration to humans or animals in conventional dosage forms such as pills, tablets, capsules, solutions, elixirs or syrups for oral use, or in liquid forms which are adaptable to the natural and synthetic cortical steroid hormones for injectable products. The novel steroids can also be administered topically in the form of ointments, creams, and the like.

The novel end products of this invention include those represented by the formula

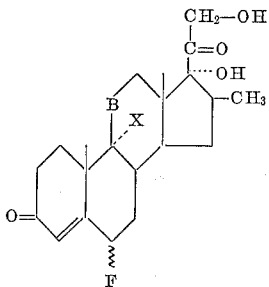

wherein B is selected from the group consisting of carbonyl, α-hydroxymethylene and β-hydroxymethylene; X is selected from the group consisting of hydrogen, methoxyl, ethoxyl, halogen, especially fluorine; and the 21-acylates thereof wherein the acyl radical is that of a hydrocarbon carboxylic acid containing from 1 to 8 carbon atoms, inclusive. The configuration of the 6-fluoro atom may be α or β. Included also within the scope of this invention are the $\Delta^{1,4}$-analogs corresponding to the above generic formula.

The process of the present invention for producing 6-fluoro-16β-methyl-steroids is illustrated by the following outline utilizing 16-methyl diosgenin as starting material. It should be understood that although the outline presents a specific order of steps, the reaction sequence may be varied considerably and modified with respect to reagents as will be understood by those skilled in the art. In addition, the reaction sequence described and exemplified hereinbelow, can be used to produce 6β-fluoro-16β-methyl-steroids or the 6α-fluoro-16β-methyl steroids merely by the omission or inclusion of the isomerization step.

The invention includes also modifications of the process which comprise using as starting material a compound obtainable as an intermediate product at any stage of the process and carrying out the remaining process steps.

The process of the present invention for preparing 6-fluoro-16β-methyl steroids comprises subjecting the appropriate 16-methylated sapogenin, such as, 16-methyl diosgenin (I) to the conventional sapogenin degradation to produce the corresponding 16β-methyl $\Delta^{5,16}$-pregnadiene-3-ol-20-one-3-acetate (II). It should be noted that this product is also available from the reaction of diazomethane on neosterol. Reduction of the thus-obtained $\Delta^{5,16}$-pregnadiene derivative (II) gives the corresponding 16β-methyl-$\Delta^5$-pregnene derivative (III) which upon enol acetylation yields the $\Delta^{5,17(20)}$-pregnadiene compound (IV). Treatment of the thus produced $\Delta^{5,17(20)}$-pregnadiene compound with hydrogen peroxide or an organic peracid produces the corresponding 5α,6α-17α,20α-dioxido-derivative (V) which upon alkaline hydrolysis gives the 5α,6α-oxido-16β-methyl-17α-hydroxy compound (VI). Conversion of the methyl group of the side chain by reaction with bromine followed by potassium acetate and potassium iodide gives the 21-acetate derivative (VII) which on treatment with hydrogen fluoride produces the 6β-fluoro corticosteroid (VIII). Oxidation of the said 6β-fluoro corticosteroid yields the 3-keto compound (IX) which on dehydration gives the 6β-fluoro-16β-methyl-$\Delta^4$-pregnene-17α,21-diol-3,20-dione-21 acetate (X).

At this point in the reaction sequence isomerization of the 6β-fluoro (X) to the 6α-fluoro (XI) epimer can conveniently be carried out. Subsequent reaction steps produce the 6β- or the 6α-fluoro epimer depending on the omission or inclusion of this isomerization step into the reaction sequence as mentioned above. The wavy line used to indicate α and/or β-orientation.

The 21-acylated-6-fluoro corticosteroid (α- or β-epimer) is then subjected to microbiological hydroxylation at the 11-position to produce the 11-hydroxyl derivative (XII). Depending upon the microorganism used, the 11α-hydroxyl- or the 11β-hydroxyl derivative can be obtained generally as the 21-alcohol since fermentation processes usually hydrolyze the acylated 21-position. Reacetylation, followed by dehydration at the 9,(11)-positions produces 6-fluoro-16β-methyl-$\Delta^{4,9(11)}$-pregnadiene-17α,21-diol-3,20-dione-21-acetate (XIII), which when treated with a hypohalogenating agent produces 6-fluoro-9α-halo-16β-methyl-$\Delta^4$-pregnene-11β,17α,21-triol-3,20-dione-21-acetate (XIV). Reaction of the said 6-fluoro-9α-halo-16β-methyl-halohydrin with potassium acetate gives the corresponding 6-fluoro-9β,11β-oxido-16β-methyl-compound which can then be converted to a halohydrin different from (XIV) by treatment with a hydrogen halide or to a 9α-alkoxy derivative by treatment with a low molecular weight alcohol in acid media. Dehydrogenation of the appropriate intermediate product (e.g. XII, XIV, XV) with selenium dioxide produces the analogous $\Delta^{1,4}$-compounds in which the 9-position bears a H, a halogen or an alkoxy group. Oxidation of the 11β-hydroxy compounds gives the corresponding 11-keto compounds.

It is an object of the present invention to provide novel 16β-methylated corticosteroids and the 21 acylates thereof. A further object of this invention is to provide novel 6-fluoro-16β-methylated corticosteroids and the 21-acylates thereof. Still a further object of this invention is to provide novel intermediates of the 6-fluoro-16β-methylated corticosteroids of the instant invention. Another object of the present invention is the provision of a process for the production of these novel 6-fluoro-16β-methylated corticosteroids and the intermediates thereof. Other objects will be apparent to those skilled in the art to which this invention pertains.

The 16-alkyl diosgenin which may be utilized as reactant in the above illustration of the valuable compounds of this invention is prepared according to the procedure of Kaufmann et al., set forth in the J. Am. Chem. Soc., 71, 3552 (1949).

In carrying out the process this invention, the 16-alkyl diosgenin (I) is degraded according to known procedures by reaction with an excess of acetic anhydride at about 200° C. to form the corresponding pseudo-sapogenin derivative which is then oxidized under mild conditions, for example, at about room temperature, with chromium trioxide to form the 3β-acetoxy-16(δ-acetoxyisocaprooxy)-allopregnene-20-one. Alkaline hydrolysis in aqueous or alcoholic solution or in the presence of an inert solvent, such as, tetrahydrofuran, produces the 3β-acetoxy-16β-methyl-$\Delta^{5,16}$-pregnadiene-20-one (II).

In the reduction step of the present invention, the 16, 17-double bond is reduced catalytically at low pressure using a group VIII metal. In the preferred embodiment of the invention, the $\Delta^{5,16}$-compound, dissolved in ethanol, is reduced with hydrogen and palladium at room temperature and 2–3 atmospheres for about 4 hours or until one mole of hydrogen is taken up. At completion of this reaction, the catalyst is removed by filtration, and the solvent evaporated to give the crude 3β-acetoxy-16β-methyl-$\Delta^5$-pregnene-20-one (III).

In carrying out the enol acetylation step, the said 20-keto steroid is reacted with an acid catalyst, such as, p-toluenesulfonic acid or sulfosalicylic acid in acetic anhydride to produce the corresponding 16β-methyl-$\Delta^{5,17(20)}$-pregnadiene-3,20-diacetate (IV). In the preferred embodiment of this invention, the 20-keto steroid is refluxed in acetic anhydride for 72 hours in the presence of p-toluene sulfonic acid. The cooled solution is then added to ice-water, stirred for one hour then extracted with ether. The gummy residue obtained on evaporation of the ether solution is triturated with acetone to give the crystalline enol acetate.

In carrying out the epoxidation step, the said enol acetate derivative of the 20-keto-derivative steroid is epoxidized with a peracid, such as, peracetic, or perbenzoic, or other known epoxidizing agent to produce the 5α,6α,17α,20α-bisepoxide (V). In the preferred embodiment of the invention, the enol acetate compound is dissolved in an organic solvent, such as, chloroform and treated with perbenzoic acid at a temperature of about 0° C. to 20° C. for several hours followed by several hours at room temperature. The reaction mixture is then washed successively with 5% aqueous sodium bicarbonate and water, the chloroform layer separated, dried, and evaporated to give the crude 5α,6α,17α,20α-bisepoxide. Recrystallization from a suitable organic solvent gives the pure 5α,6α,17α,20α - bisoxido-16β-methyl-$\Delta^5$-pregnane-3β, 20-diacetate (V).

Mild alkaline hydrolysis of the 17α,20α-oxide ring is preferably accomplished by means of dilute (e.g. 10%) aqueous sodium bicarbonate to produce 5α,6α-oxido-16β-methyl-allo-pregnane-3β,17α-diol-20-one (VI).

The said 20-ketosteroid is converted to the corresponding corticosteroid 21-acetate by treatment with bromine, sodium iodide and potassium acetate. In the preferred embodiment of the invention, a solution of the 20-ketosteroid in carbon tetrachloride and acetic acid is treated portionwise with a molar equivalent of bromine in carbon tetrachloride at about room temperature. After about 15 minutes following completion of addition, the carbon tetrachloride is removed in vacuo and the residue poured into a large volume of water to precipitate the 21-bromo compound, which is filtered and dried at about 40° C. The dry solid is then dissolved in benzene-methanol and methanolic-hydrogen bromide added. After about 8–12 hours at room temperature, the mixture is diluted with water and extracted with ether. The dry ethereal extract is concentrated to small volume, diluted with benzene to 5 to 10 times its volume and then treated with sodium iodide in absolute ethanol. After about 1 day at room temperature, the mixture is diluted with water, extracted with ether and the ether extract washed successively with 3% aqueous sodium thiosulfate and water. The residue remaining after evaporation of the ether is added to a solution of freshly fused potassium acetate in acetone, refluxed for about 5 hours, then concentrated to small volume, diluted with water and extracted with ether. Evaporation of the water-washed and dried ethereal solution gives crude 5α,6α- oxido-16β-methyl-allo-pregnane-3β,17α, 21-triol-20-one 21-acetate (VII).

In the oxide opening step, the 5α,6α-oxido-pregnane compound is reacted with hydrogen fluoride or other fluorinating agent to open the epoxide ring and produce the corresponding 6β - fluoro-16β-methyl-allo-pregane-3β,5α, 17α,21-tetrol-20-one 21-acetate (VII). The epoxide opening step can be performed under anhydrous or aqueous conditions in the presence or absence of a catalyst, such as, boron trifluoride. When anhydrous conditions are employed, a temperature of about 30° C. to −20° C. is generally employed. The use of anhydrous conditions does not hydrolyze the 21-acetate function whereas, aqueous conditions result in hydrolysis of the 21-acetate. Thus, in a specific embodiment of the invention under aqueous conditions, a solution of the 5α,6α-epoxide in an organic solvent, such as, chloroform, methylene chloride, benzene and the like, is admixed with aqueous hydrofluoric acid at about room temperature for up to five hours; generally, however, from one-half to two hours. The mixture is poured into a large volume of water, neutralized with aqueous sodium bicarbonate and the organic solvent layer separated, dried and evaporated. The 21-alcohol group of the crude product is then reacetylated according to conventional procedures. The 6-fluoro-compound thus obtained consists essentially of the 6β-fluoro epimer. If desired, the 6α-epimer can be separated by chromatographic or recrystallization techniques well known in the art. When preparation of the 6α-fluoro-16β-methyl-substituted corticosteroid end-product is desired the separation of the epimeric fluoro derivatives is not necessary.

In the oxidation step of the present invention, the 6β-fluoro-16β-methyl - allopregnane-3β,5α,17α,21-tetrol-3-one 21-acetate is dissolved in a suitable organic solvent and treated with an oxidizing agent such as, chromic acid, for a relatively brief period generally about 15 to 60 minutes. In the preferred embodiment of this invention, an acetic acid solution of chromic acid is added to a solution of the 3β-hydroxy compound in glacial acetic acid. After about one-half hour alcohol is added and the mixture concentrated under reduced pressure. The desired 3-keto compound, 6β-fluoro-16β-methyl-allopregnane-5α,17α,21-triol-3,20-dione 21-acetate (I) is isolated with chloroform and recrystallized from a suitable solvent.

The dehydration step involves the conversion of the pregnane derivative (IX) to the corresponding 6β-fluoro-16β-methyl-$\Delta^4$-pregnene-17α,21-diol-3, 21-dione 21-acetate (X). This reaction can be performed under dehydration conditions known in the art, for example, by reaction of the said pregnane compound with acid dehydrating agents, such as, hydrochloric acid, sulfuric acid, acetic anhydride, acetic acid, and p-toluene sulfonic acid. In the preferred embodiment of the invention, dehydration is preferably conducted in the presence of acetic acid or hydrochloric acid.

Isomerization of the 6β-epimer, or of mixtures consisting of the 6α- and 6β-epimers, is accomplished by treatment of the 6β-fluoro compound (or mixture thereof with the 6α-epimer) with a prototropic agent, such as, water, alcohols, organic acids and mineral acids. In the preferred embodiment of this invention, a solution if the 6β-fluoro compound in chloroform and methanol is treated with anhydrous hydrogen chloride at −5° C. to −10° C. for about 3 hours. At the end of this period the reaction mixture is diluted with chloroform, washed successively with sodium bicarbonate and water and evaporated to dryness under reduced pressure. The product, 6α-fluoro-16β-methyl - $\Delta^4$ - pregnene - 17α,21-diol-3,20-dione 21-acetate (XI), is then recovered from the crude reaction product and purified by recrystallization.

It should be understood that the remaining reaction sequence applies equally well to the 6α- or the 6β-fluoro compounds of this invention. The particular 6-fluoro compound used depends only on the final product desired. When, of course, the 6β-fluoro epimer of the final product is desired, the isomerization step is omitted. In the following description and illustrations, it is understood that although the compounds are listed as 6-fluoro compounds, both the 6α- and 6β-epimers are included; the appropriate 6α- or 6β-fluoro compound being used in a given reaction.

In the hydroxylation step, a microbiological oxidation process is used to introduce an 11-hydroxyl group. Depending upon the particular microorganism used an 11β- or an 11α-hydroxyl group can be introduced into the steroid molecule. The preferred process for introducing an 11β-hydroxyl group involves contacting the 11-desoxy steroid compound in an aqueous nutrient medium with the oxygenating activity of an organism of the genus Curvularia as described by Shull et al., in U.S. Patent 2,658,023. The formation of the 11α-hydroxy derivative is preferably accomplished by subjecting the 11-desoxy steroid compound to the oxygenating activity, in an aqueous nutrient medium, of a fungus of the genus Pestalotia as described by Shull et al. in U.S. Patent 2,721,163. The 11-hydroxyl (α- or β-) derivative (XII) is then reacetylated to the 6-fluoro-16β-methyl - $\Delta^4$ - pregnene-11,17α,21-triol-3,20-dione 21-acetate, in accordance with known procedures. Oxidation then produces the corresponding 11-keto compound.

For the production of the 9α-substituted compounds of this invention, the said 11-hydroxyl compound is then dehydrated at the 9, 11 positions with a suitable dehydrating agent, such as, methanesulfonyl chloride or p-toluenesulfonyl chloride. In the preferred embodiment of this invention, a pyridine solution of the said 11-hydroxyl compound is treated with a pyridine solution of methanesulfonyl chloride at about 0° C. to −20° C. After one to four hours, the reaction mixture is allowed to come to room temperature and, following several hours at room temperature, is added dropwise to cold water to precipitate the 6-fluoro-16β-methyl-$\Delta^{4,\,9(11)}$-pregnadiene-17α,21-diol-3,20-dione 21-acetate (XIII).

In carrying out the process of the present invention to produce 9α-halo 11β-hydroxy derivatives (XIV) the $\Delta^{4,\,9(11)}$-steroid is dissolved in an inert organic solvent, such as dioxane, and reacted with a hypohalous acid such as, hypobromous or hypochlorous acid, or with a hypohalous acid releasing agent in the presence of an acid. Such hypohalous releasing agents include N-bromo-acetamide, N-chloroacetamide, N-bromo-succinimide, N-iodo-succinimide, and N-chlorosuccinimide. Such agents permit the formation of a hypohalous acid in situ when treated with aqueous sulfuric acid, perchloric acid, and the like. The reaction is generally conducted at about room temperature using from equimolar up to 25% excess of hypohalous acid releasing agent. At the completion of reaction, generally not over 2 hours, the excess of hypohalous acid is destroyed by the addition of sodium sulfite or hyposulfite. The 9α-halo-11β-hydroxy derivative thus produced is isolated by the addition of water, followed by filtration of the precipitated product or extraction with an organic solvent. Purification is accomplished by recrystallization from a suitable organic solvent such as acetone. In the preferred embodiment of this invention the $\Delta^{4,\,9(11)}$-pregnadiene derivative is dissolved in dioxane and perchloric acid solution at room temperature, and treated with solid N-bromoacetamide. The reaction mixture is protected from light and, after 1 hour, the excess perchloric acid is destroyed by the addition of aqueous sodium sulfite. The 9α-bromo-11β-hydroxy halohydrin is isolated as described above and purified by recrystallization from acetone. The said halohydrin is then converted to the 9β,11β-oxide derivative by treatment with sodium or potassium acetate at room temperature for several hours. The epoxide is recovered by the addition of water followed by evaporation of the alcohol under reduced pressure and extraction of the aqueous solution with chloroform. The product is purified by recrystallization from a suitable organic solvent such as acetone.

Conversion of the 9β,11β-oxide to a halohydrin different from the foregoing halohydrin is accomplished by treatment with a halogenating agent such as, hydrogen halide, in a suitable organic solvent. The halogenating agent used may be the gaseous hydrogen halide, a concentrated aqueous solution, or a metal halide which releases hydrogen halide from treated with acids. The anhydrous hydrogen halides are generally preferred since they permit the use of temperatures ranging from 0° C. to 50° C. and relatively short reaction times. The product is recovered by neutralizing the excess hydrogen halide followed by extraction with water immiscible solvents, such as, methylene chloride and ethylene chloride. Evaporation of the organic solvent leaves the crude halohydrin which is purified by recrystallization from a suitable organic solvent.

In the preferred embodiment of this invention the 9β,11β-oxide is treated with hydrogen fluoride as described above to give 6,9α-difluoro-16β-methyl-$\Delta^4$-pregnene-11β,17α,21-triol,3,20-dione 21-acetate (XIV, where X=fluoro) which is then hydrolyzed under acid conditions to the corresponding 21-alcohol. Substitution of hydrogen bromide, hydrogen chloride or hydrogen iodide for hydrogen fluoride produces the corresponding 9α-bromo-, chloro- or iodo-compounds.

Oxidation of the 11β-hydroxyl group to the 11-keto group is accomplished as described above for the formation of compound IX to give 6,9α-difluoro-16β-methyl-$\Delta^4$-pregnene-17α,21-diol-3,11,20-trione 21-acetate (XV).

Dehydration of the 11β-hydroxy compound or of the 11-keto compound in the form of their 21-acetates is accomplished with excess selenium dioxide in a high boiling inert organic solvent such as, phenetole, diethylene glycol diether, dibutyl cellosolve, xylene, dioxane, and so forth. A tertiary organic base may be added to expedite reaction. In the preferred embodiment of this invention the steroid compound, dibutylcellosolve, a 10 molar excess of selenium dioxide and an equivalent molar quantity of pyridine are refluxed in an atmosphere of nitrogen for several hours. Upon completion of the reaction, the mixture is filtered or decanted, evaporated in vacuo and the $\Delta^{1,4}$-pregnadiene compounds (XVI, XVII) isolated by crystallization from a suitable organic solvent or by chromatography on various adsorbents.

When it is desired to prepare the 6-fluoro-9α-alkoxyl-16β-methyl derivatives of the instant invention, the 9α-alkoxyl substituent can be introduced into the steroid nucleus by a modification of the above reaction sequence which comprises the acid catalyzed opening of the 9β,11β-epoxide compound in the presence of a lower alcohol.

The order of the various steps described above can be varied and modified considerably as will be recognized by those skilled in the art. The following examples are given to illustrate the process of the present invention and are not to be construed as limiting.

Compounds such as those exemplified in the process outlined by Formulas VIII through XIII are useful as intermediates in the preparation of other biologically active steriods by methods which will be apparent to those skilled in the art. Some of them, in fact, are biologically active per se.

EXAMPLE I

*3β-acetoxy-16β-methyl-Δ⁵-pregnene-20-one*

The 3-acetoxy derivative of 16-methyl diosgenin (50 g.), prepared according to the procedure of Kaufmann et al., J. Am. Chem. Soc., 71, 3552 (1949), is subjected to the conventional sapogenin degradation as described by Marker, U.S. 2,352,848 to give 3β-acetoxy-16β-methyl-$\Delta^{5,16}$-pregnadiene-20-one.

To a suspension of 5% Pd-on-charcoal (50 g.) in glacial acetic acid (1 l.) which had been pre-reduced with hydrogen, is added a solution of 3β-acetoxy-16β-methyl $\Delta^{5,16}$-pregnadiene-20-one (30 g.) in glacial acetic acid (1.5 l.) and the mixture agitated in an atmosphere of hydrogen until a molar equivalent of hydrogen is absorbed. The reduced product is isolated with chloroform and recrystallized from acetone-hexane to give pure 3β-acetoxy-16β-methyl-Δ⁵-pregnene-20-one.

EXAMPLE II

*16β-methyl-$\Delta^{5,17(20)}$-pregnadiene-3β,20-diacetate*

3β-acetoxy-16β-methyl-Δ⁵-pregnene-20-one (25 g.), p-toluene sulfonic acid (1 g.) and acetic anhydride (75 g.) are refluxed for 72 hours, cooled and poured into ice-water (1 l.). After one hour, the mixture is extracted with ether. The gummy residue obtained on evaporation of the dry ethereal extract is triturated with acetone to give 16β-methyl-$\Delta^{5,17(20)}$-pregnadiene-3β-20-diacetate.

EXAMPLE III

*5α,6α,17α,20α-dioxido-16β-methyl-allo-pregnane-3β,20-diacetate*

To a solution of 16β-methyl-$\Delta^{5,17(20)}$-pregnadiene-3β,20-diacetate (20 g.) in chloroform (400 ml.) is added a chilled solution of perbenzoic acid (7.6 g.) dissolved in chloroform (125 ml.). After 24 hours at about 5° C. followed by 72 hours at room temperature, the solution is washed with 5% aqueous sodium bicarbonate and then with water. The chloroform layer is separated, dried and evaporated to give the crude diepoxide. Recrystallization from methanol gives pure 5α,6α,17α,20α, dioxido-16β-methyl-allo-pregnane-3β, 20-diacetate.

EXAMPLE IV

*5α,6α-oxido-16β-methyl-allo-pregnane-3β-17α-diol-20-one*

5α,6α,17α,20α - dioxide-16β-methyl-allopregnane-3β,20-diacetate (15 g.) is added to a molar equivalent of 10% aqueous sodium bicarbonate at room temperature. After about 4 hours, the mixture is neutralized and extracted with ether. The residue remaining after evaporation of the dried ethereal extract is recrystallized from acetone to give 5α,6α-oxido-16β-methyl-allopregnane-3β,17α-diol-20-one.

EXAMPLE V

*5α,6α-oxido-16β-methyl-allopregnane-3β,17α,21-triol-20-one 21-acetate*

To a well stirred solution of 5α,6α-oxido-16β-methyl-allopregnane-3β,17α-diol-20-one (12 g.) in carbon tetrachloride (100 ml.) at room temperature, a molar equivalent of bromine (5.3 g.) in carbon tetrachloride (40 ml.) is added dropwise over a 45 minute period. The carbon tetrachloride is then distilled off under reduced pressure and below 35° C. and the residue poured into water, filtered and dried at about 40° C. The dry solid is dissolved in benzene (75 ml.) and methanol (175 ml.) and hydrogen bromide (5 g.) in methanol (15 ml.) added. After 10 hours, the mixture is diluted with water and extracted with ether. To the ethereal extract which is washed with water, dried and concentrated, benzene (150 ml.) and sodium iodide (35 g.) in absolute ethanol (175 ml.) is added. After about 24 hours at room temperature, the mixture is diluted with water and extracted with ether. The ethereal extract is washed successively with 3% sodium thiosulfate and water, then evaporated to dryness. To the residue in acetone (300 ml.) is added freshly-fused potassium acetate (40 g.) in acetone (40 ml.). The mixture is refluxed for 5 hours, concentrated to a small volume, diluted with water and extracted with ether. From the water-washed and dried ethereal extract, crude 5α,6α-oxido - 16β-methyl-allopregnane-3β,17α,21-triol-20-one 21-acetate is obtained upon evaporation. Recrystallization from acetone gives the pure product.

EXAMPLE VI-A

*6β-fluoro-16β-methyl-allopregnane-3β,5α,17α,21-tetrol-20-one 21-acetate*

Into each of two polyethylene bottles containing a solution of 5α,6α-oxido-16β-methyl-allopregnane-3β,17α,21-triol-20-one 21-acetate (5.0 g.) in methylene chloride (75 ml.) at 0° C. to 5° C. is passed anhydrous hydrogen fluoride (10 g.). After vigorous stirring for 2 hours, the combined reaction mixtures are evaporated to dryness to give crude 6β - fluoro-16β-methyl-allopregnane-3β,5α,17α,21-tetrol-20-one 21-acetate.

EXAMPLE VI-B

To a solution of 5α,6α - oxido - 16β - methyl - allopregnane - 3β,17α,21 - triol - 20 - one 21 - acetate (3 g.) in methylene chloride (45 ml.) contained in a polyethylene beaker is added 48% aqueous hydrofluoric acid (14.5 ml.). After vigorous stirring for one hour at room temperature the reaction mixture is poured into 350 ml. of water. The crude product is filtered, dried and reacetylated according to conventional methods to give 6β-fluoro-16β - methyl - allopregnane - 3β,5α,17α,21 - tetrol - 20 - one 21-acetate. Recrystallization from isopropyl ether gives the pure product.

EXAMPLE VII

*6β-fluoro-16β-methyl-allopregnane-5α,17α,21-triol-3,20-dione 21-acetate*

6β - fluoro - 16β - methyl - allopregnane - 3β,5α,17α,21-tetrol-3,20-dione-21- acetate (5 g.) is oxidized in glacial acetic acid (120 ml.) with chromium trioxide (2.0 g.) dissolved in 50% aqueous acetic acid at about 12° C. to 15° C. for about 40 minutes. The mixture is poured into water (1000 ml.) and neutralized with sodium bicarbonate to give 6β-fluoro-16β-methyl-allopregnane-5α,17α,21-triol-3,20-dione 21-acetate.

EXAMPLE VIII

*6β-fluoro-16β-methyl-Δ⁴-pregnene-17α,21-diol-3,20-dione-21-acetate*

A solution of 6β - fluoro - 16β - methyl - allopregnane - 5α,17α,21-triol-3,20-dione-21-acetate (10 g.) in acetic acid (490 ml.) and water (10 ml.) is refluxed for about 1 hour, cooled, diluted with water (5.1) and evaporated to dryness under reduced pressure. Chromatography over Florisil (synthetic magnesium silicate) and elution with methylene chloride-acetone gives 6β-fluoro-16β-methyl-Δ⁴-pregnene-17α,21-diol-3,20-dione 21-acetate.

EXAMPLE IX

*6α-fluoro-16β-methyl-Δ⁴-pregnene-17α,21-diol-3,20-dione 21-acetate*

Into a solution of 6β-fluoro-16β-methyl-Δ⁴-pregnene-17α,21-diol-3,20-dione 21-acetate (10 g.) in chloroform (850 ml.) and absolute alcohol (7 ml.) at −5° to −10° C., a stream of anhydrous hydrochloric acid is bubbled for about 3 hours. At the end of this period, the solution is diluted with chloroform (1.5 l.), washed successively with sodium bicarbonate and water, dried and evaporated to dryness under reduced pressure at 35–4g° C. The residue is recrystallized from acetone-Skellysolve B to give pure 6α - fluoro - 16β - methyl - Δ⁴ - pregnene - 17α,21-diol-3,20-dione 21-acetate.

Although in the following procedures the compounds are listed as 6-fluoro compounds, it is understod that both the 6α- and the 6β-fluoro compounds are prepared.

EXAMPLE X-A

*6-fluoro-16β-methyl-Δ⁴-pregnene-11β,17α,21-triol-3,20-dione 21-acetate*

11β-hydroxylation of the 11-desoxy product of Example IX in accordance with U.S. Patent 2,658,023 yields 6-fluoro - 16β - methyl - Δ⁴ - pregnene - 11β,17α,21 - triol - 3,20 - dione. Reacetylation according to conventional methods gives the corresponding 21-acetate. Similar treatment of the 6β-fluoro product of Example VIII gives the corresponding 6β-fluoro-11β-hydroxylated compound.

EXAMPLE X-B

*6-fluoro-16β-methyl-Δ⁴-pregnene-11α,17α,21-triol-3,20-dione 21-acetate*

11α-hydroxylation of the 11-desoxy products of Examples VIII and IX in accordance with U.S. Patent 2,721,163 yield 6 - fluoro - 16β - methyl - Δ⁴ - pregnene - 11α,17α,21-triol-3,20-dione. Reacetylation according to conventional methods gives the corresponding 21-acetate.

EXAMPLE XI

*6-fluoro-16β-methyl-Δ⁴,⁹⁽¹¹⁾-pregnadiene-17-17α,21-diol-3,20-dione 21-acetate*

To a solution of 6 - fluoro - 16β - methyl - Δ⁴ - pregnene - 11β,17α,21-triol-3,20-dione 21-acetate (2 g.) in anhydrous pyridine (25 ml.) cooled to 0° C., and protected from atmospheric moisture, is added a solution of methane sulfonyl chloride (1.9 ml.) in chloroform (3 ml.). After about one hour at 0° C., the mixture is allowed to come to room temperature and left standing for ten hours. The solution is then added dropwise to 2.2 l. of ice water with stirring to precipitate the 6-fluoro-16β-methyl-Δ⁴,⁹⁽¹¹⁾-pregnadiene-17α,21-diol-3,20-dione 21-acetate. The product is recovered by filtration, dried and recrystallized from ethyl acetate. Hydrolysis with methanolic-hydrogen chloride in the conventional manner gives the 21-alcohol.

EXAMPLE XII

*6-fluoro-9α-bromo-16β-methyl-Δ⁴-pregnene-11β,17α,21-triol-3,20-dione*

Solid N-bromoacetamide (0.48 g.) is added dropwise with stirring to a suspension of 6-fluoro-16β-methyl-Δ⁴,⁹⁽¹¹⁾-pregnadiene-17α,21-diol-3,20-dione 21-acetate (1 g.) and 0.4 N perchloric acid (1.5 ml.) in peroxide-free dioxane (40 ml.) at room temperature over a period of about one hour. The reaction mixture is protected from light during the addition and for an additional hour. 10% aqueous sodium sulfite is added with stirring until KI-starch paper no longer turns blue. Ice (25 g.) and chloroform (100 ml.) is added and the layers separated. The chloroform dioxane solution is washed with water, then concentrated to a syrup in vacuo at room temperature. The addition of acetone (85 ml.) to the syrup causes rapid crystallization. The mixture is chilled overnight, then filtered. Additional product is recovered from the filtrate by evaporation to dryness. Recrystallization from acetone gives pure 6 - fluoro - 9α - bromo - 16β - methyl - Δ⁴ - pregnene - 11β,17α,21 - triol - 3,20 - dione. Acetylation with acetic anhydride in pyridine gives the 21-acetate.

EXAMPLE XIII

*6-fluoro-9β,11β-oxido-16β-methyl-Δ⁴-pregnene-17α,21-diol-3,20-dione-21-acetate*

A solution of 6-fluoro-9α-bromo-16β-methyl-Δ⁴-pregnene-11β,17α,21-triol-3,20-dione-21-acetate (1 g.) in dioxane (35 ml.) is added to a solution of anhydrous potassium acetate (0.7 g.) in absolute alcohol (7 ml.) heated to near reflux temperature. The mixture is heated to reflux for about 45 minutes and then cooled rapidly. The product, 6 - fluoro - 9β,11β - oxido - 16β - methyl - Δ⁴ - pregnene-17β,21-diol-3,20-dione-21-acetate, is precipitated by the addition of ice water and filtered. Concentration of the filtrate permits isolation of additional product. The same product is obtained when the corresponding 9α-chloro or 9α-fluoro derivative is employed as starting material. Hydrolysis by means of methanolic-hydrogen chloride yields the 21-alcohol.

EXAMPLE XIV

*6-fluoro-9α-methoxy-16β-methyl-Δ⁴-pregnene-11β,17α,21-triol-3,20-dione*

A solution of 6 - fluoro - 9β,11β - oxido - 16β - methyl - Δ⁴ - pregnene - 17α,21 - diol - 3,20 - dione 21 - acetate (100 mg.) in methanol (8 ml.) and 72% perchloric acid (0.5 ml.) is held at room temperature for about 3 hours then neutralized with sodium bicarbonate solution and evaporated in vacuo. The product is isolated with chloroform. Reacetylation with acetic anhydride in pyridine gives the corresponding 21 - acetate. Substitution of ethanol for methanol produces the corresponding 6-fluoro-9α - ethoxy - 16β - methyl - Δ⁴ - pregnene - 11β,17α,21 - triol-3,20-dione.

EXAMPLE XV

*6,9α-difluoro-16β-methyl-Δ⁴-pregnene-11β,17α,21-triol-3,20-dione-21-acetate*

Approximately 0.6 g. of anhydrous hydrogen fluoride is passed into a solution of 6-fluoro-9β,11β-oxido-16β-methyl - Δ⁴ - pregnene-17α,21-diol-3,20-dione-21-acetate (0.5 g.) in redistilled chloroform (10 ml.) contained in a polyethylene bottle at 0° C. The mixture becomes an intense red color and separates into two layers. After 1.5 hours at 0° C., the mixture is made weakly alkaline by the addition of sodium bicarbonate solution. The chloroform layer is separated and evaporated to dryness to give the crude 6,9α-difluoro-16β-methyl-Δ⁴-pregnene-11β,17α,21-triol-3,20-dione-21acetate. The product is recrystallized from ethyl acetate. Hydrolysis with methanolic-hydrogen chloride in the conventional manner produces the corresponding 21-alcohol. By slight modifications of this procedure, the analogous 9α-bromo-, and 9α-chloro-16β-methyl compounds are prepared from the respective hydrogen halides.

EXAMPLE XVI

*6,9α-difluoro-16β-methyl-Δ⁴-pregnene-17α,21-diol-3,11,20-trione 21-acetate*

Oxidation of 6,9α-difluoro-16β-methyl-Δ⁴-pregnene-11β,17α,21-triol-3,20-dione 21-acetate with chromium trioxide in acetic acid according to the procedure of Example VII produces the 6,9α-difluoro-16β-methyl-Δ⁴-pregnene-17α,21-diol-3,11,20-trione 21-acetate. Acid hydrolysis according to known procedures gives the corresponding 21-alcohol. In the same manner, the following 11-keto-16β-methyl pregnenes are produced from the appropriate starting material:

6-fluoro-9α-chloro-16β-methyl-Δ⁴-pregnene-17α,21-diol-3,11,20-trione 6-fluoro-9α-bromo-16β-methyl-Δ⁴-pregnene-17α,21-diol-3,11,20-trione 6-fluoro-16β-methyl-Δ⁴-pregnene-17α,21-diol-3,11,20-trione 6-fluoro-9α-methoxy-16β-methyl-Δ⁴-pregnene-17a,21-diol-3,11,20-trione 6-fluoro-9α-ethoxy-16β-methyl-Δ⁴-pregnene-17α,21-diol-3,11,20-trione

EXAMPLE XVII

*6,9α-difluoro-16β-methyl-Δ¹,⁴-pregnadiene-11β,17α,21-triol-3,20-dione*

A mixture of 0.5 g. of 6,9α-difluoro-16β-methyl-Δ⁴-pregnene-11β,17α,21-triol-3,20-dione-21-acetate, freshly sublimed selenium dioxide (0.5 g.) and 10 ml. of dibutyl Cellosolve is heated in a nitrogen atmosphere for about 10 hours at 175° C. The brown supernatant solution is decanted from the residual solid and cooled to room temperature. The addition of low boiling petroleum ether precipitates the impure 6,9α-difluoro-16β-methyl-Δ$^{1,4}$-pregnadiene-11β,17α,21-triol-3,20-dione-11-acetate which is purified by chromatographic separation on a Florisil column. Hydrolysis according to the method of Example I gives the corresponding 21-alcohol.

Following the same procedure, the 16β-methyl-Δ$^{1,4}$-pregnadienes listed below are prepared:

6-fluoro-16β-methyl-Δ$^{1,4}$-pregnadiene-11β,17α,21-triol-3,20-dione 6-fluoro-9α-chloro-16β-methyl-Δ$^{1,4}$-pregnadiene-11β,17α,21-triol-3,20-dione 6-fluoro-9α-bromo-16β-methyl-Δ$^{1,4}$-pregnadiene-11β,17α,21-triol-3,20-dione 6-fluoro-9α-methoxy-16β-methyl-Δ$^{1,4}$-pregnadiene-11β,17α,21-triol-3,20-dione 6-fluoro-9α-ethoxy-16β-methyl-Δ$^{1,4}$-pregnadiene-11β,17α,21-triol-3,20-dione 6-fluoro-16β-methyl-Δ$^{1,4}$-pregnadiene-17α,21-diol-3,11,20-trione 6-fluoro-9α-chloro-16β-methyl-Δ$^{1,4}$-pregnadiene-17α,21-diol-3,11,20-trione 6-fluoro-9α-bromo-16β-methyl-Δ$^{1,4}$-pregnadiene-17α,21-diol-3,11,20-trione 6-fluoro-9α-methoxy-16β-methyl-Δ$^{1,4}$-pregnadiene-17α,21-diol-3,11,20-trione 6-fluoro-9α-ethoxy-16β-methyl-Δ$^{1,4}$-pregnadiene-17α,21-diol-3,11,20-trione 6,9α-difluoro-16β-methyl-Δ$^{1,4}$-pregnadiene-17α,21-diol-3,11,20-trione

EXAMPLE XVIII

A variety of 21-esters of the compounds prepared in accordance with the procedures of Examples VI through XVII are prepared by treating each of the free alcohols of the said examples, obtained by acid hydrolysis according to conventional methods, with acylating agents according to known procedures. These include such esters as the formate, the propionate, the isobutyrate, the hexanoate, the octanoate, and the succinate.

The process of this invention is outlined below:

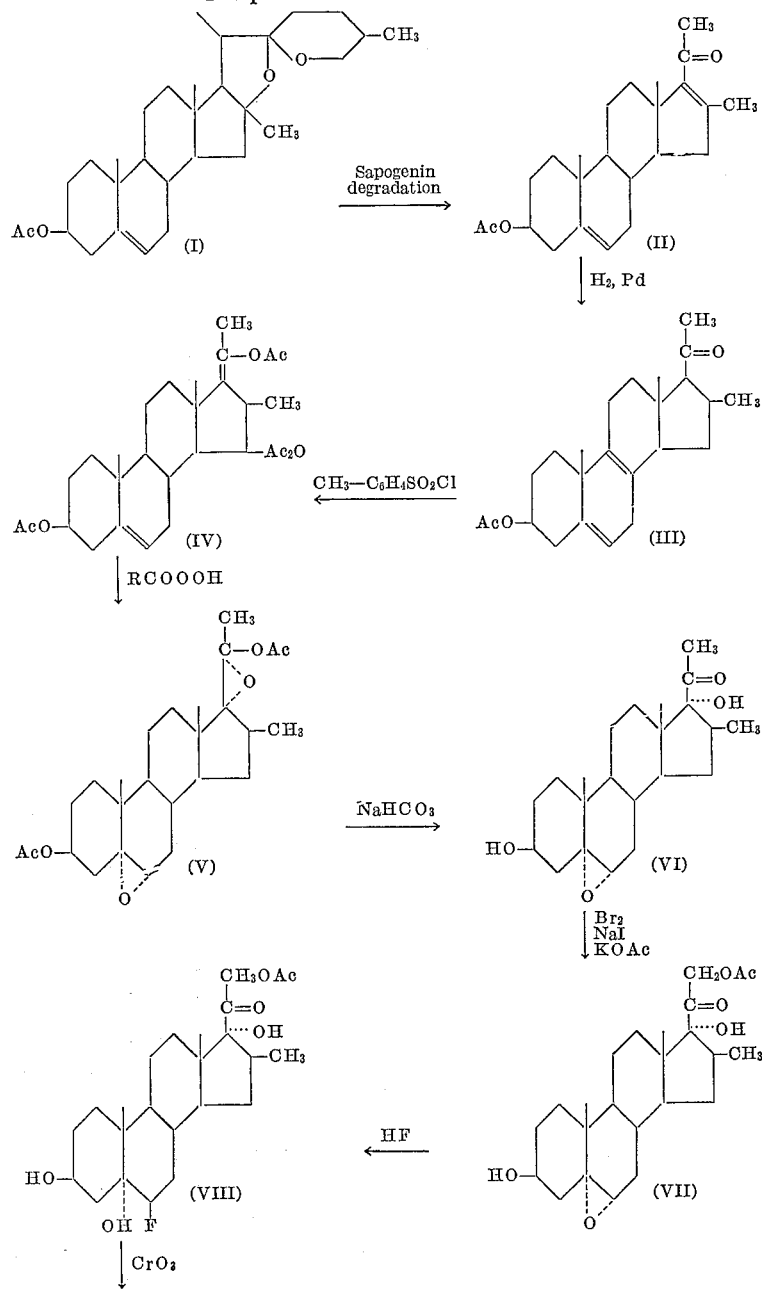

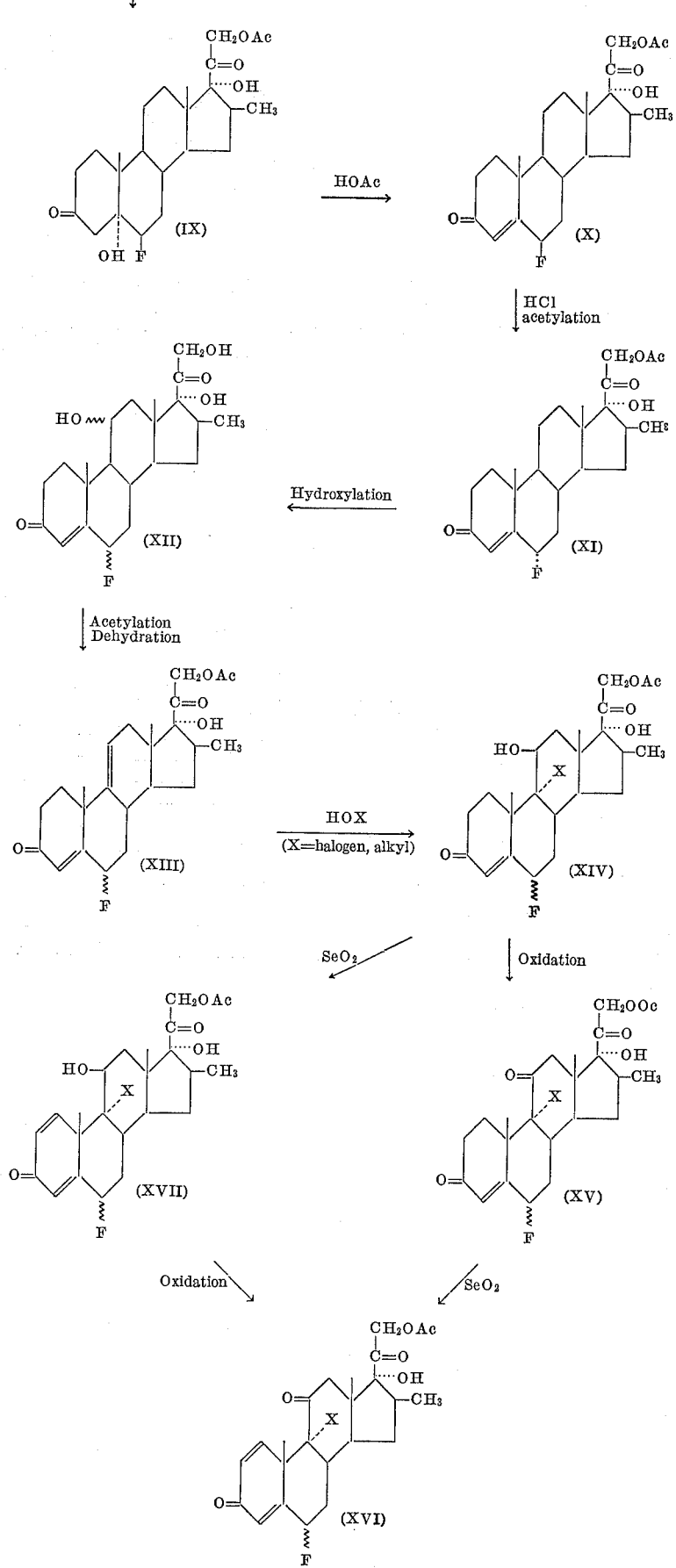

What is claimed is:
1. A compound selected from the group consisting of those having the formula

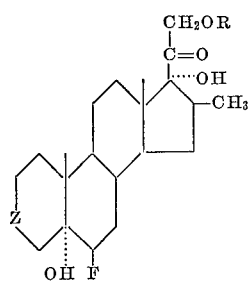

wherein R is selected from the group consisting of hydrogen and acyl radical of a hydrocarbon carboxylic acid containing from 1 to 8 carbon atoms inclusive; and Z is selected from the group consisting of β-hydroxymethylene and carbonyl.

2. A compound of the formula

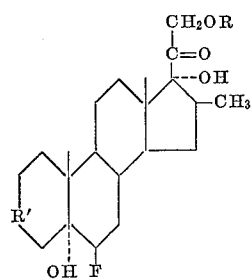

wherein R is an acyl radical of a hydrocarbon carboxylic acid containing from 1 to 8 carbon atoms and R' is selected from the group consisting of β-hydroxymethylene and carbonyl.

3. A compound selected from the group consisting of 6β-fluoro-16β-methyl-allopregnane - 3β,5α,17α,21 - tetrol-20-one and its 21-acetate.

4. A compound selected from the group consisting of 6β-fluoro - 16β - methyl-allopregnane-5α,17α,21-triol-3,20-dione and its 21-acetate.

5. A compound of the formula:

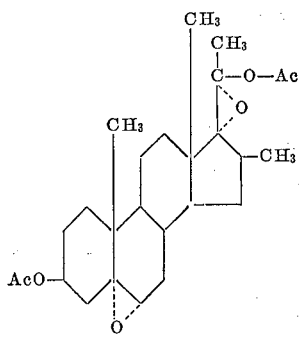

wherein Ac is an acyl radical of a hydrocarbon carboxylic acid containing from 1 to 8 carbon atoms.

6. 3β,20β - dihydroxy - 5α,6α,17α,20α - diepoxy-16β-methyl-pregnane-3,20-diacetate.

7. A compound of the formula:

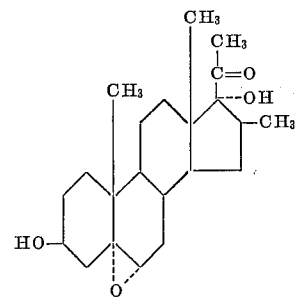

References Cited by the Examiner
UNITED STATES PATENTS

| | | | |
|---|---|---|---|
| 2,838,497 | 6/58 | Spero et al. | 260—239.55 |
| 2,838,498 | 6/58 | Magerlein et al. | 260—239.55 |
| 2,838,499 | 6/58 | Spero et al. | 260—239.55 |
| 2,841,600 | 7/58 | Hogg et al. | 260—397.45 |

OTHER REFERENCES

Bowers et al.: 80 J.A.C.S., 4423–24 (1958).
Taub et al.: 80 J.A.C.S., 4435 (1958).

LEWIS GOTTS, *Primary Examiner.*
LESLIE H. GASTON, MORRIS LIEBMAN, *Examiners.*

UNITED STATES PATENT OFFICE
CERTIFICATE OF CORRECTION

Patent No. 3,207,751                          September 21, 1965

Ellis Rex Pinson, Jr.

It is hereby certified that error appears in the above numbered patent requiring correction and that the said Letters Patent should read as corrected below.

Column 2, line 39, after "line" insert -- is --; column 3, line 11, after "process" insert -- of --; column 6, line 21, for "from" read -- when --; column 8, line 72, for "35-4g° C." read -- 35-45° C. --; column 9, line 49, for "0.4 N" read -- 0.46 N --; columns 11 and 12, formula (III), for that portion reading

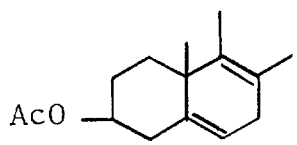      read      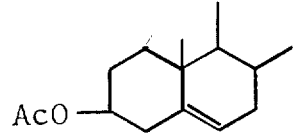

same columns 11 and 12, formula (VIII), for the upper right-hand portion of the formula reading

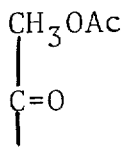      read      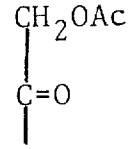

columns 13 and 14, formula (XV), for the upper right-hand portion of the formula reading

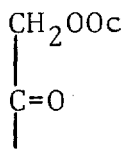      read      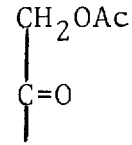

Signed and sealed this 7th day of June 1966.

(SEAL)
Attest:

ERNEST W. SWIDER                      EDWARD J. BRENNER
Attesting Officer                    Commissioner of Patents